United States Patent [19]
Whisenhunt

[11] Patent Number: 5,954,285
[45] Date of Patent: Sep. 21, 1999

[54] DRIVING ARRANGEMENT FOR A MOTORIZED FISHING REEL

[76] Inventor: Kelsie C. Whisenhunt, 3311 51st Ave. Terrace West, Bradenton, Fla. 34207

[21] Appl. No.: 08/740,983

[22] Filed: Nov. 6, 1996

[51] Int. Cl.⁶ .................................................. A01K 89/017
[52] U.S. Cl. .......................... 242/250; 242/256; 242/262; 242/283; 242/307; 254/352; 254/357; 254/362; 254/369; 43/21
[58] Field of Search ..................................... 242/250, 256, 242/259, 262, 263, 283, 296, 307; 43/21; 254/344, 317, 316, 320, 352, 353, 357, 362, 369

[56] References Cited

U.S. PATENT DOCUMENTS

| | | | |
|---|---|---|---|
| 2,978,224 | 4/1961 | Moseley et al. | 254/344 |
| 3,799,005 | 3/1974 | Koehler | 254/344 X |
| 3,979,081 | 9/1976 | Miyamae | 242/250 |
| 4,130,271 | 12/1978 | Merriman | 254/369 X |
| 4,240,309 | 12/1980 | Tyler | 254/369 |
| 4,283,025 | 8/1981 | Whisenhunt . | |
| 5,370,366 | 12/1994 | Ottemann | 254/344 X |

*Primary Examiner*—Donald P. Walsh
*Assistant Examiner*—Emmanuel M. Marcelo
*Attorney, Agent, or Firm*—Bacon & Thomas, PLLC

[57] ABSTRACT

A driving arrangement for a motorized fishing reel has a first or driving gear, a second larger gear, a third or pinion gear, and a fourth gear. The driving gear is mounted to and driven by a shaft of a motor. The second gear is meshed with and driven by the driving gear. The pinion gear is meshed with and driven by the second gear. The fourth gear is meshed with and driven by the pinion gear. A clutch arrangement including a cam clicker input drive and a cam plate output drive is disposed such that the cam clicker positively engages and is driven by the fourth gear for rotation in one direction when the motor is actuated and the cam clicker yields from engagement with the fourth gear when the clutch arrangement rotates in that one direction relative to the fourth gear. A reel shaft is connected to the cam plate such that the reel shaft and the cam plate rotate with each other in that one direction.

5 Claims, 3 Drawing Sheets

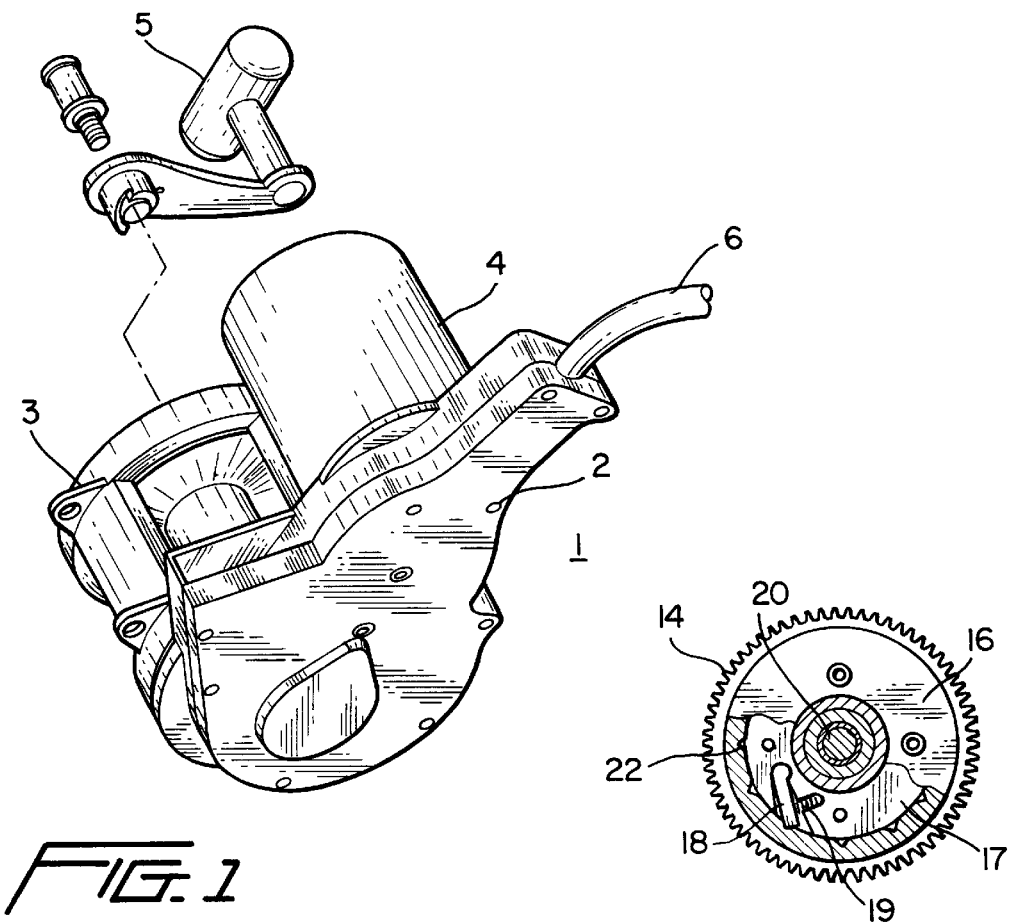
FIG. 1
FIG. 3
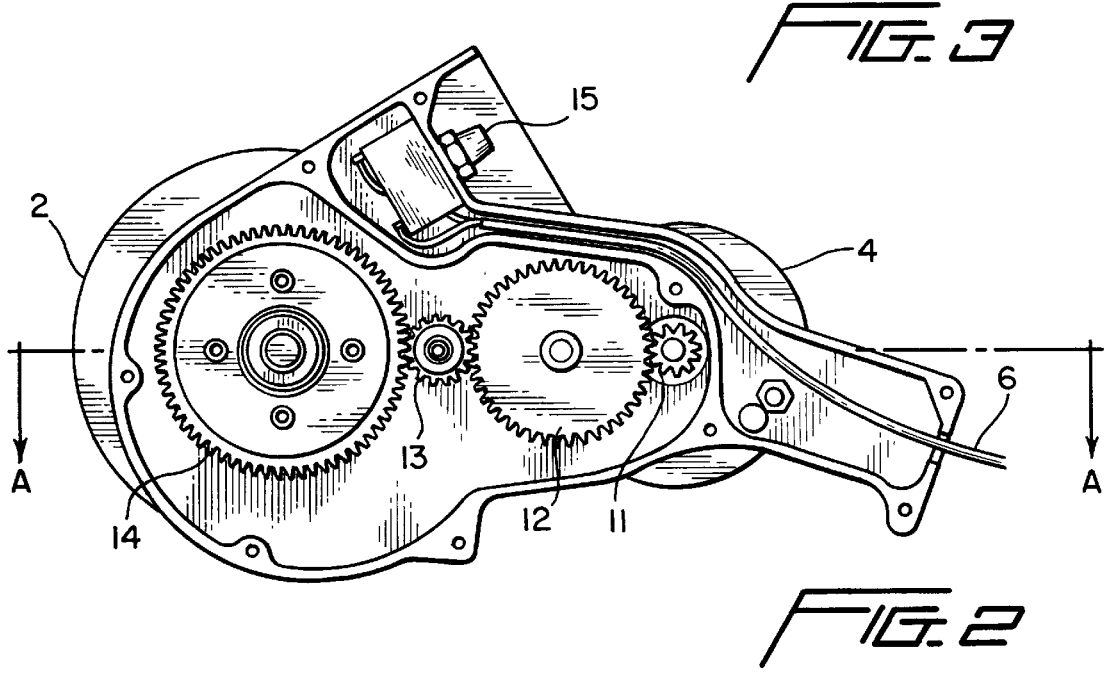
FIG. 2

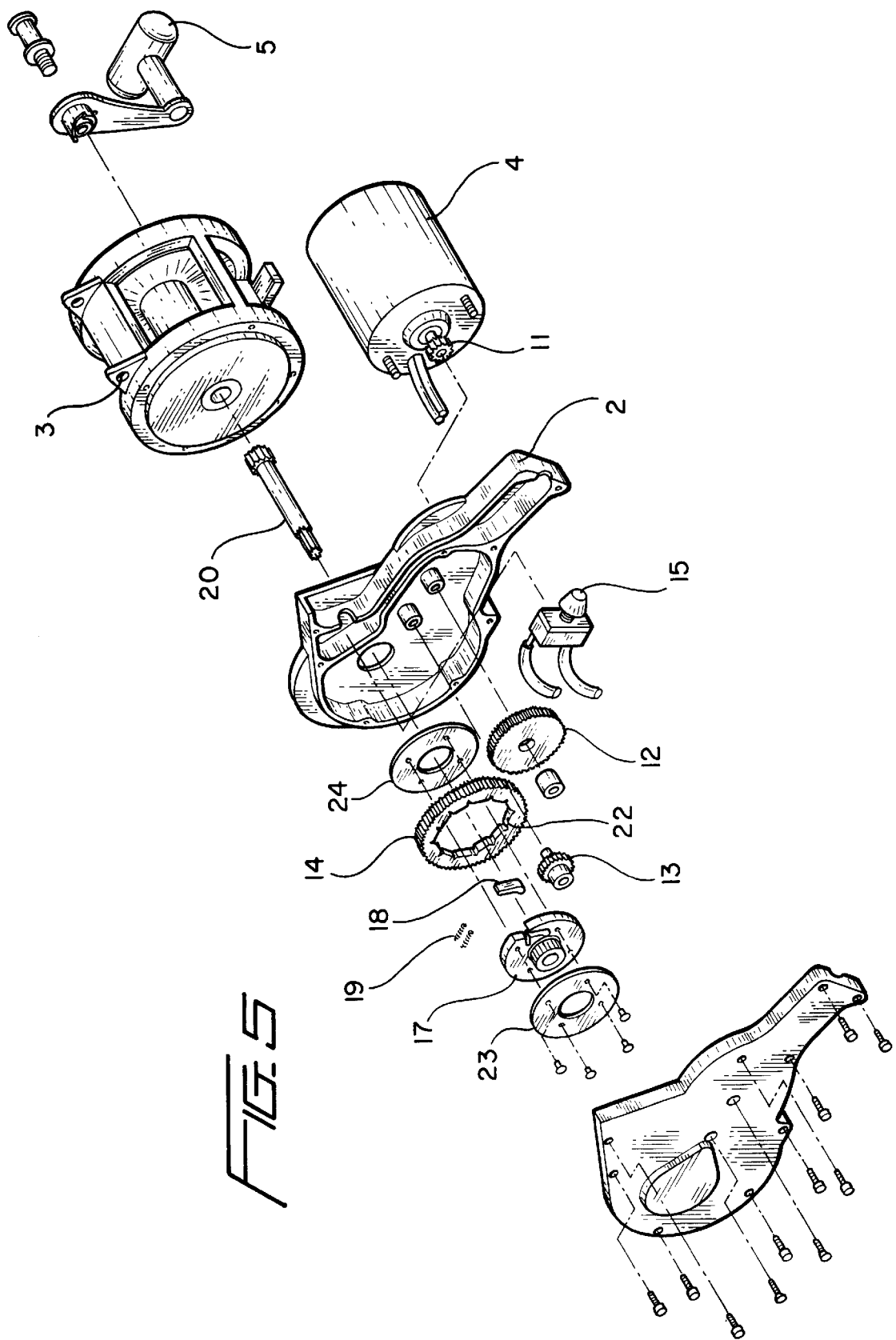

DRIVING ARRANGEMENT FOR A MOTORIZED FISHING REEL

The present invention is directed to an improved driving arrangement for a motorized fishing reel structure, particularly in which an improvement involves a fishing reel being directly driven by a motor through a mechanism including a series of gears.

BACKGROUND OF THE INVENTION

Motorized fishing reels, especially for deep sea fishing, have been known for some time. In this respect, for example, the present inventor has previously developed in U.S. Pat. No. 4,283,025 a motorized fishing reel which was designed to be mounted permanently with a driving motor. The drive design in this patent used a sprocket chain belt drive system working off of a driving gear of a motor to turn the reel. This motorized drive mechanism provided power to the reel in the same manner as a hand crank. Such a construction, however, may suffer from problems common to belt type drives, such as slippage, breakage of the belt, and inaccurate control of the motion of the reel.

SUMMARY OF THE INVENTION

The present invention is directed to a motorized fishing reel device in which a motor, connected to a fishing reel, drives the reel directly through a gearing system.

This enables a primary drive system that is more reliable and stronger in operation than past devices.

According to the invention, a set of spur gears is aligned to enable the motor to drive the gears so that the fishing reel is driven in rotation in one direction, while an operator of the fishing reel can override this motor drive by releasing a clutch mechanism to control the reel by hand.

The number of gears in a set of gears for driving the reel and the respective number of teeth in each gear are designed to provide a controlled drive of the reel in which the drive may be in a given direction.

Further, the present invention controls the driving of the fishing reel through a gearing system of a ring gear having an internal gear and clutch mechanism which act to directly drive the fishing reel.

These features of the present invention are realized by way of a gearing mechanism in which the internal gear is provided in the internal surface of a driven ring gear and turns the fishing reel upon movement of the motor turning the ring gear through the gearing mechanism. A cam system having a clicker inserted between the internal gear and a cam plate, moves the cam plate in rotation which turns the shaft of the reel in the given direction of rotation. The cam clicker is inserted at an angle within the cam plate and is held outwardly by springs so that the end of the clicker will slide over the gear teeth of the internal gear in one direction of rotation but will move the cam plate in rotation in the opposite direction of rotation.

In a preferred arrangement of the present invention the motor moves a first driving gear in rotation, which then drives a second gear in rotation, which moves a third gear in rotation, which finally turns the ring gear in rotation. This driving of the ring gear in rotation then causes the internal gear to activate the cam system to move the fishing reel in rotation.

BRIEF DESCRIPTION OF THE DRAWING FIGURES

The present invention will be described in reference to the accompanying drawing figures, which show for purposes of illustration only the following:

FIG. 1 is a showing of an assembled motorized fishing reel, except for the handle mechanism pulled away from the reel for easier viewing of the present invention;

FIG. 2 is an illustration of the preferred gearing mechanism of the present invention upon removing the cover plate of the device in FIG. 1;

FIG. 3 is a partial sectional view at different levels, partly broken away, of the ring gear mechanism and cam system of the present invention;

FIG. 5 is an exploded view of the motorized fishing reel according to FIG. 2 of the present invention.

DESCRIPTION OF THE INVENTION

Figure 4:
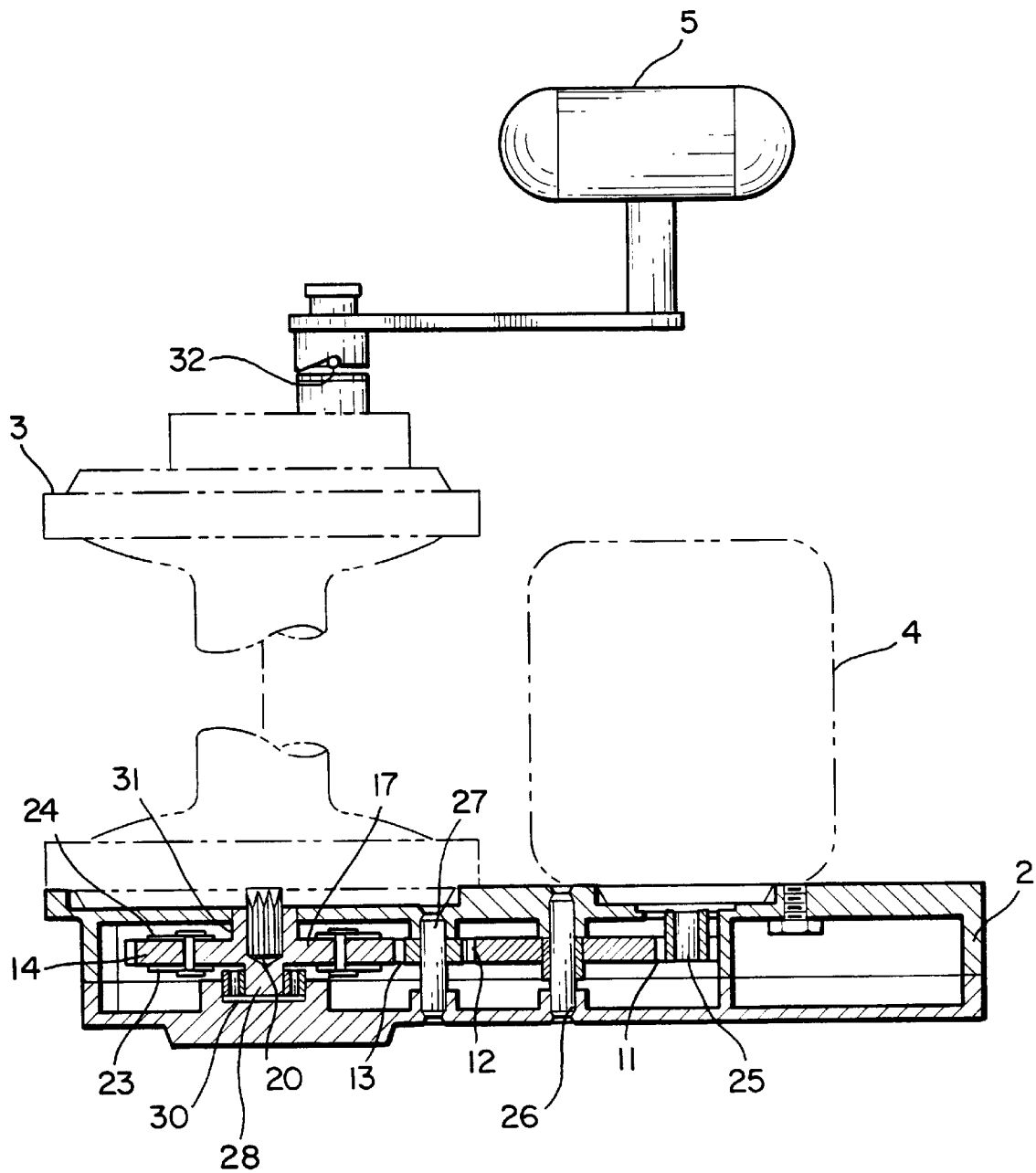
FIG. 4 is a cross-sectional view through lines A—A, looking from the side of FIG. 2.

The motorized fishing reel 1 of the present invention is shown in FIG. 1. This arrangement includes a housing 2 of the drive mechanism, a fishing reel 3 with a manual driving handle 5 and a motor 4 for running the reel, both the reel and motor being mounted to the housing 2. As may be seen in FIG. 4, the housing 2 contains a first or driving gear 11 mounted to the motor 4 by way of shaft 25 to turn a second larger gear 12 rotating on a shaft 26 to turn a third or pinion gear 13, turning on shaft 27, to turn a fourth gear large ring gear 14.

The ring gear 14 is mounted in the housing 2 by way of a bearing structure 30 to be rotatable in either direction of rotation. When the motor 4 is activated by depressing the switch 15 to connect the motor to a power source, such as a D.C. battery or an A.C. generator, through the wiring 6, the ring gear 14 will rotate in one direction to move a clutch arrangement of a cam clicker 18 drive input and cam plate 17 drive output by way of a plurality of teeth 22 of an inner circumference or internal gear of the ring gear 14.

This gearing arrangement may be further seen by reference to FIGS. 3 and 5 in which the ring gear 14 with its internal gear teeth 22 are shown. Upon activating the motor drive of the reel, the motor drives the driving gear 11 in rotation which turns the larger gear 12 running the pinion gear 13 to turn the ring gear 14. The ring gear 14 with the internal gearing mechanism including teeth 22 rotates the fishing reel 3 through the cam structure having the cam plate 17 and cam clicker driven in rotation by the internal teeth 22 of the ring gear 14 when the ring gear is turned in one direction. The cam clicker 18 is maintained by way of a pair of springs 19 within a slanted opening of the circular cam plate 17 in a direction that bears against the respective teeth 22 of the internal gear of the ring gear 14. There are a pair of these springs 19, each providing control of the clicker even if the other spring fails for some reason. The cam plate 17 and reel 3 are driven by the clicker structure in the one direction, and are free to rotate in the one direction of rotation independent of the ring gear 14. This mechanism thus acts as a one-way clutch to enable a motor drive to rotate the reel in the one direction of rotation or to allow a manual drive of the reel by turning the handle 5. In this case, the cam clicker 18 will slip over the teeth 22 of the internal gear of the ring gear 14 to allow manual control of the fishing reel by turning the handle 5 to move the reel free of the ring gear 14.

The cam plate 17 is attached to a fishing reel shaft 20 by way of a concentric tube 31 of the cam structure which is fastened to the shaft 20 by a pin or set screw (not shown) fixed against a flat surface of the shaft 20. Further, the cam plate 17 is maintained mounted in connection with the ring gear through the cam structure 18 by way of opposing plates 23 and 24 fixed at opposite sides of the cam plate 17 and ring gear 14.

The motor 4 is activated by way of an electrical connection through the line 6 which may be connected to a power source (not shown), either A.C. or D.C., and by the switch 15 which completes the circuit when activated. When the switch is pushed, the motor is turned on and rotates the driving gear 11 to ultimately drive the fishing reel in rotation through the gearing mechanism described above with the gears 12 and 13 and the ring gear 14 connected to the shaft of the fishing reel by way of the cam clicker 18 and cam plate 17. Upon release of the motor drive, movement of the reel 3 by the handle 5 the clutch so that manual operation of the reel can occur. This is achieved upon pushing the handle 5 toward the reel 3 to cause the pin mechanism 32, shown in FIG. 4, to engage the handle and thus turn a mechanism for turning the reel on the shaft 20.

While a preferred embodiment of the present invention is described in detail, the present application contemplates all modifications of the invention that are evident in the art. Such modifications of the present invention are included within the scope of the attached claims.

What I claim:

1. A driving arrangement for a motorized fishing reel including a motor constituting a first driving device driving a motor shaft, comprising:

a first or driving gear (11) mounted to and driven by the motor shaft;

a second gear larger (12) than said first gear meshed with and driven by said driving gear;

a third or pinion gear (13) meshed with and driven by said second gear;

a fourth gear (14) meshed with and driven by said third gear;

a cam clicker drive input (18) which positively engages and is driven by said fourth gear for rotation in one direction when the motor is actuated;

a cam plate drive output (17) connected to said cam clicker drive input to form a clutch arrangement;

a reel shaft (20) connected to a fishing reel and also connected to said cam plate such that said reel shaft and said cam plate rotate with each other in said one direction; and a second driving device (5) connected to said reel shaft to rotate said reel shaft and said cam plate in said one direction, said cam clicker yielding from engagement with said fourth gear when said clutch arrangement is rotated by said second driving device in said one direction relative to said fourth gear.

2. A driving arrangement according to claim 1, wherein said second driving device comprises:

a manual driving handle connected to and selectively engageable with said reel shaft such that said handle rotates said reel shaft and said clutch arrangement in said one direction independent of said fourth gear, said third gear, said second gear, said first gear and said motor.

3. A driving arrangement according to claim 1, wherein said fourth gear is a ring gear and said clutch arrangement is disposed within said ring gear.

4. A driving arrangement according to claim 3, further comprising:

a plurality of teeth disposed on an inner circumference of said ring gear such that said teeth engage said cam clicker when said ring gear rotates in said one direction;

an opening located along an outer circumference of said cam plate and wherein said cam clicker is disposed; and a biasing device urging said cam clicker into engagement with at least one of said teeth such that said biasing device yields when said clutch arrangement rotates in said one direction relative to said fourth gear.

5. A driving arrangement according to claim 4, wherein said second driving device comprises:

a manual driving handle connected to and selectively engageable with said reel shaft such that said handle rotates said reel shaft and said clutch arrangement in said one direction independent of said fourth gear, said third gear, said second gear, said first gear and said motor.

* * * * *